(12) United States Patent
Chandramouli et al.

(10) Patent No.: US 10,555,218 B2
(45) Date of Patent: Feb. 4, 2020

(54) METHOD AND APPARATUS TO ADDRESS USER EQUIPMENT POWER CONSUMPTION

(71) Applicant: NOKIA SOLUTIONS AND NETWORKS OY, Espoo (FI)

(72) Inventors: Devaki Chandramouli, Plano, TX (US); Jari Mutikainen, Lepsämä (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/565,292

(22) PCT Filed: Apr. 7, 2015

(86) PCT No.: PCT/US2015/024751
§ 371 (c)(1),
(2) Date: Oct. 9, 2017

(87) PCT Pub. No.: WO2016/163998
PCT Pub. Date: Oct. 13, 2016

(65) Prior Publication Data
US 2018/0115923 A1    Apr. 26, 2018

(51) Int. Cl.
*H04W 4/00* (2018.01)
*H04W 28/14* (2009.01)
(Continued)

(52) U.S. Cl.
CPC ......... *H04W 28/14* (2013.01); *H04L 67/2842* (2013.01); *H04W 28/0215* (2013.01); *H04W 88/182* (2013.01); *H04W 76/16* (2018.02)

(58) Field of Classification Search
CPC .............. H04W 28/14; H04W 88/182; H04W 28/0215; H04W 76/16; H04L 67/2861; H04L 67/2842
See application file for complete search history.

(56) References Cited

U.S. PATENT DOCUMENTS

2006/0023710 A1* 2/2006 Read ............... H04L 1/1835
370/389
2010/0312846 A1* 12/2010 Lu .................. H04W 68/00
709/206
(Continued)

FOREIGN PATENT DOCUMENTS

WO    WO 2014/166030 A1    10/2014

OTHER PUBLICATIONS

International Search Report & Written Opinion dated Jul. 9, 2015 corresponding to International Patent Application No. PCT/US2015/024751.

(Continued)

*Primary Examiner* — Clemence S Han
(74) *Attorney, Agent, or Firm* — Squire Patton Boggs (US) LLP

(57) ABSTRACT

A method and apparatus may include determining whether a user equipment is reachable or not. The method may also include determining whether a network should buffer downlink data. The determining whether the network should buffer the downlink data is based on stored context information or by querying an evolved Node B. The method may also include requesting a first network node to buffer the downlink data for a duration. The method may also include informing a second network node if the user equipment is determined to be unreachable. The method may also include informing the second node if the downlink data has been buffered.

15 Claims, 15 Drawing Sheets

(51) Int. Cl.
H04W 88/18 (2009.01)
H04W 28/02 (2009.01)
H04L 29/08 (2006.01)
H04W 76/16 (2018.01)

(56) References Cited

U.S. PATENT DOCUMENTS

| | | | | |
|---|---|---|---|---|
| 2012/0063464 | A1* | 3/2012 | Mehta | H04W 28/02 370/401 |
| 2012/0275365 | A1* | 11/2012 | Anderson | H04W 52/0219 370/311 |
| 2014/0148158 | A1* | 5/2014 | Cho | H04W 28/14 455/435.1 |
| 2016/0021639 | A1* | 1/2016 | Ma | H04W 52/0216 455/458 |
| 2016/0095154 | A1* | 3/2016 | Palm | H04W 48/18 370/329 |
| 2016/0286385 | A1* | 9/2016 | Ryu | H04W 76/28 |
| 2017/0041854 | A1* | 2/2017 | Kim | H04W 28/02 |
| 2017/0374542 | A1* | 12/2017 | Ryu | H04W 8/08 |
| 2018/0242246 | A1* | 8/2018 | Ryu | H04W 8/02 |

OTHER PUBLICATIONS

3GPP TR 23.708 V1.1.0 (Feb. 2015), Technical Report, 3rd Generation Partnership Project; Technical Specification Group Services and System Aspects; Architecture Enhancements for Service Capability Exposure (Release 13), Feb. 2015.
3GPP TR 23.709 V0.2.0 (Nov. 2014), Technical Report, 3rd Generation Partnership Project; Technical Specification Group Services and System Aspects; Study on Optimizations to Support High Latency Communications; Stage 2 (Release 13), Nov. 2014.
3GPP TR 23.789 V13.0.0 (Mar. 2015), Technical Report, 3rd Generation Partnership Project; Technical Specification Group Services and System Aspects; Monitoring enhancements (Release 13), Mar. 2015.
3GPP TR 23.887 V12.0.0 (Dec. 2013), Technical Report, 3rd Generation Partnership Project; Technical Specification Group Services and System Aspects; Study on Machine-Type Communications (MTC) and other mobile data applications communications enhancements (Release 12), Dec. 2013.
3GPP TS 23.401 V13.2.0 (Mar. 2015), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2015.
3GPP TS 36.413 V12.5.0 (Mar. 2015), Technical Specification, 3rd Generation Partnership Project; Technical Specification Group Radio Access Network; Evolved Universal Terrestrial Radio Access Network (E-UTRAN); S1 Application Protocol (S1AP) (Release 12), Mar. 2015.
Supplementary European Search Report dated Oct. 4, 2018 corresponding to European Patent Application No. 15888651.5.
3GPP TR 23.709 V1.1.0 (Feb. 2015), Technical Report, 3rd Generation Partnership Project; Technical Specification Group Services and System Aspects; Study on Optimizations to Support High Latency Communications; Stage 2 (Release 13), 3GPP Standard; Mar. 18, 2015, pp. 1-31, XP055508873.
Alcatel-Lucent, "Analysis of HLCOM solution space," 3GPP Draft; S2-143244, SA WG2 Meeting #105, Oct. 13-17, 2014, Sapporo, Japan, Oct. 12, 2014, XP050880816.

* cited by examiner

METHOD AND APPARATUS TO ADDRESS USER EQUIPMENT POWER CONSUMPTION

BACKGROUND

Field

Embodiments of the present invention relate to addressing user equipment power consumption.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include determining, by a first network node, whether a user equipment is reachable or not. The method may also include determining whether a network should buffer downlink data. The determining whether the network should buffer the downlink data is based on stored context information or by querying an evolved Node B. The method may also include requesting a second network node to buffer the downlink data for a duration. The method may also include informing a third network node if the user equipment is determined to be unreachable. The method may also include informing the third node if the downlink data has been buffered.

In the method of the first embodiment, the user equipment is determined to not be reachable if the user equipment is in a power-saving mode or an extended discontinuous sleep mode.

In the method of the first embodiment, the first network node comprises a mobility management entity. The second network node comprises a serving gateway. The third network node comprises an application server or a service capability exposure function.

In the method of the first embodiment, the method may also include determining that the user equipment is stationary. The method may also include paging a last-known evolved Node B to which the user equipment was connected to. The user equipment is determined to be in the extended discontinuous sleep mode.

In the method of the first embodiment, the method may also include determining that the user equipment will wake up soon from power saving mode based upon a configurable threshold. The method may also include transmitting either a downlink data notification acknowledgment or a downlink data notification failure to the second network node.

According to a second embodiment, an apparatus may include at least one processor. The apparatus may also include at least one memory including computer program code. The at least one memory and the computer program code may be configured, with the at least one processor, to cause the apparatus at least to determine whether a user equipment is reachable or not. The apparatus may also be caused to determine whether a network should buffer downlink data. The determining whether the network should buffer the downlink data is based on stored context information or by querying an evolved Node B. The apparatus may also be caused to request a first network node to buffer the downlink data for a duration. The apparatus may also be caused to inform a second network node if the user equipment is determined to be unreachable. The apparatus may also be caused to inform the second network node if the downlink data has been buffered.

In the apparatus of the second embodiment, the user equipment is determined to not be reachable if the user equipment is in a power-saving mode or an extended discontinuous sleep mode.

In the apparatus of the second embodiment, the apparatus may include a mobility management entity. The first network node may include a serving gateway. The second network node comprises an application server or a service capability exposure function.

In the apparatus of the second embodiment, the apparatus is further caused to determine that the user equipment is stationary. The apparatus is also caused to page a last-known evolved Node B to which the user equipment was connected to. The user equipment is determined to be in the extended discontinuous sleep mode.

In the apparatus of the second embodiment, the apparatus is further caused to: determine that the user equipment will wake up soon from power saving mode based upon a configurable threshold. The apparatus may also be caused to transmit either a downlink data notification acknowledgment or a downlink data notification failure to the network node.

According to a third embodiment, a computer program product may be embodied on a non-transitory computer readable medium. The computer program product may be configured to control a processor to perform a method according to the first embodiment.

According to a fourth embodiment, a method may include determining, by a first network node, that a second network node has determined that a user equipment is unreachable as a result of the user equipment being in a power-saving mode or an extended discontinuous sleep mode. The method may also include buffering downlink data for a certain duration.

In the method of the fourth embodiment, the first network node comprises a serving gateway, and the second network node comprises a mobility management entity.

In the method of the fourth embodiment, the method may further include receiving a downlink data notification acknowledgment or a downlink data notification failure from the second network node.

According to a fifth embodiment, an apparatus may include at least one processor. The apparatus may also include at least one memory including computer program code. The at least one memory and the computer program code may be configured, with the at least one processor, to cause the apparatus at least to determine that a network node has determined that a user equipment is unreachable as a result of the user equipment being in a power-saving mode or an extended discontinuous sleep mode. The apparatus may also be caused to buffer downlink data for a certain duration.

In the apparatus of the fifth embodiment, the apparatus comprises a serving gateway, and the network node comprises a mobility management entity.

In the apparatus of the fifth embodiment, the apparatus is further caused to receive a downlink data notification acknowledgment or a downlink data notification failure from the network node.

According to a sixth embodiment, a computer program product may be embodied on a non-transitory computer readable medium. The computer program product may be configured to control a processor to perform a method according to the fourth embodiment.

According to a seventh embodiment, a method may include determining, by an evolved Node B, that a delay in paging will occur and that a longer buffer is not available. The method may also include notifying a mobility management entity about the delay.

According to an eighth embodiment, an apparatus may include at least one processor. The apparatus may also include at least one memory including computer program code. The at least one memory and the computer program code may be configured, with the at least one processor, to cause the apparatus at least to determine that a delay in paging will occur and that a longer buffer is not available. The apparatus may also be caused to notify a mobility management entity about the delay.

According to ninth embodiment, a computer program product may be embodied on a non-transitory computer readable medium. The computer program product may be configured to control a processor to perform a method according to the seventh embodiment.

According to a tenth embodiment, a system may include a first apparatus, a second apparatus, and a third apparatus. The first apparatus may include a first determining means that determines whether a user equipment is reachable or not. The first apparatus may also include a second determining means that determines whether a network should buffer downlink data. The determining whether the network should buffer the downlink data is based on stored context information or by querying an evolved Node B. The first apparatus may also include a requesting means that requests a second apparatus to buffer the downlink data for a duration. The first apparatus may also include a first informing means that informs a third apparatus if the user equipment is determined to be unreachable. The first apparatus may also include a second informing means that informs the third apparatus if the downlink data has been buffered. The second apparatus may also include third determining means that determines that the first apparatus has determined that a user equipment is unreachable as a result of the user equipment being in a power-saving mode or an extended discontinuous sleep mode. The second apparatus may also include buffering means that buffers downlink data for a certain duration. The third apparatus may also include fourth determining means that determine that a delay in paging will occur and that a longer buffer is not available. The third apparatus may also include notifying means that notifies the first apparatus about the delay.

BRIEF DESCRIPTION OF THE DRAWINGS

For proper understanding of the invention, reference should be made to the accompanying drawings, wherein.

DETAILED DESCRIPTION

Certain embodiments of the present invention relate to addressing user equipment power consumption. 3GPP SA2 has an ongoing study for high latency communication (Hlcom) referred to as "Optimizations to support High Latency Communication" in Technical Report 23.709. Power Saving Mode (PSM) was defined in Release 12 Technical Specification 23.401. A UE is generally not reachable for paging while in PSM. HLcom is working on defining procedures where the network buffers mobile terminated (MT) data until the UE wakes up from the PSM. Another work item in SA2 (in the area of machine type communications (MTC)) will be directed to implementing extended DRX (eDRX) cycle for Power Consumption Optimization, but the start of this work is still pending the approval of SA plenary. eDRX is directed to extending the idle mode DRX cycle of the UE for up to 10 minutes and more. It has been agreed to include the mobile terminating data communication aspects of the eDRX into the HLcom study. For example, a similar buffering solution that is defined for PSM should also be applicable for eDRX. In order to provide similar buffering for eDRX, there is a proposal in HLCom (Solution 2, in section 5.2 in Technical Report (TR) 23.709) where the serving gateway (SGW) buffers downlink (DL) packets until the UE wakes up from sleep (when utilizing either eDRX or power save mode (PSM)) and receives the paging, and/or until the radio bearers for user plane can be established.

Figure 1:
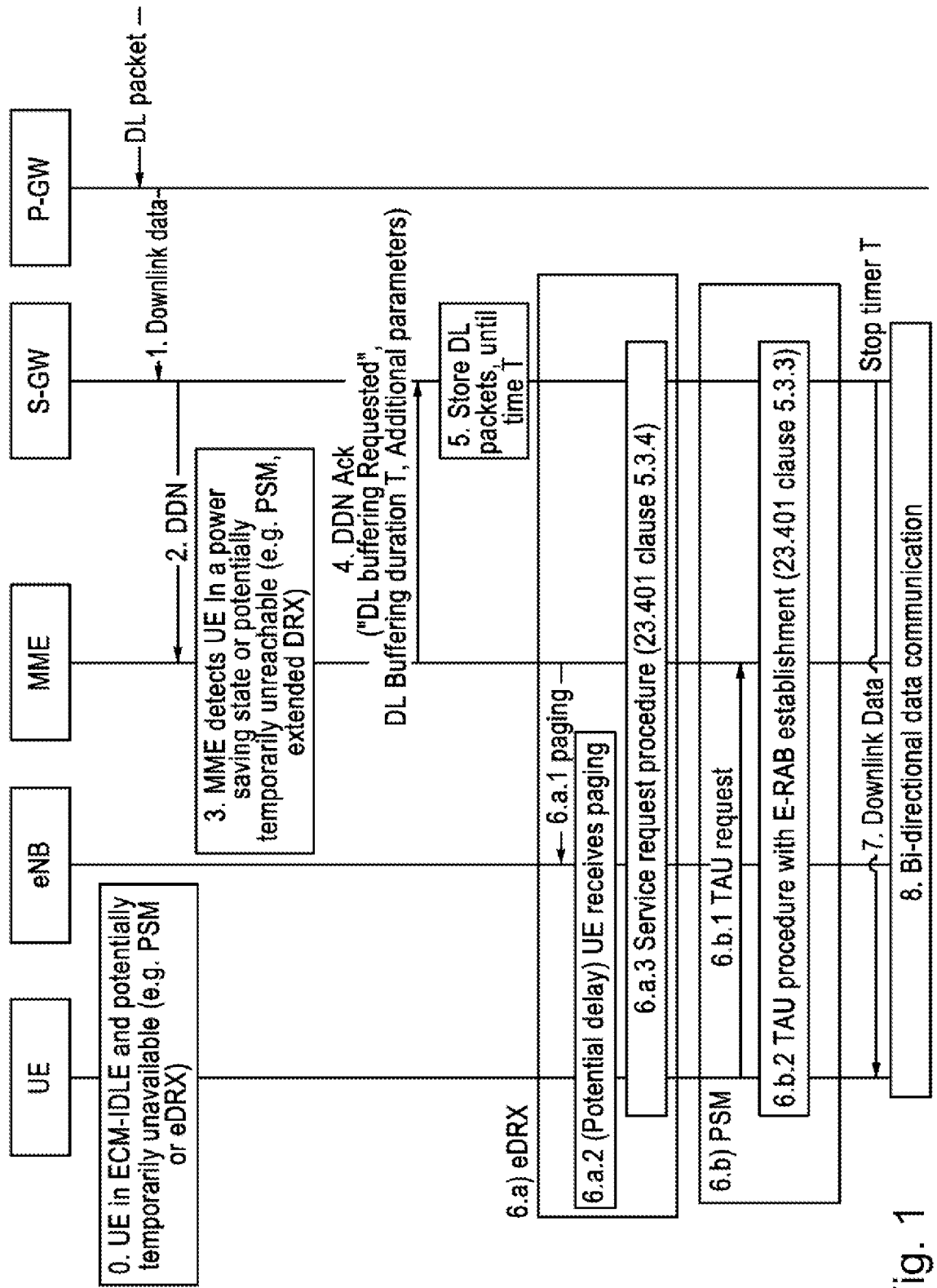
FIG. 1 reproduces FIG. 5.2.1-1 of Technical Report 23.709.
Figure 5:
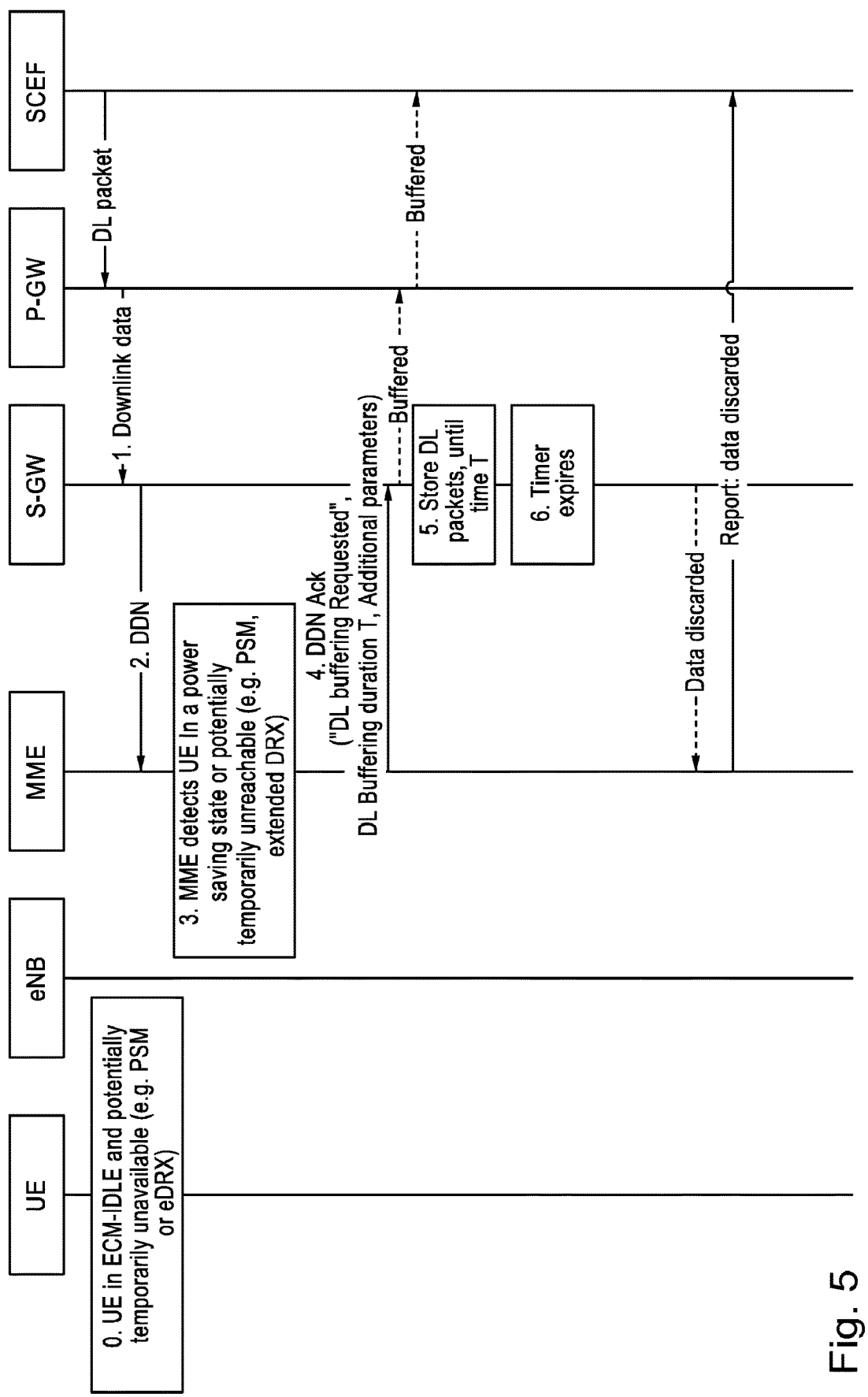
FIG. 5 illustrates the scenario when the MME detects that the UE is using eDRX and that the MT data cannot be delivered to the UE before time-out occurs in SGW.

FIG. 1 reproduces FIG. 5.2.1-1 of Technical Report 23.709. The idea in solution 2 of Technical Report 23.708 is that the mobility management entity (MME) knows that the UE is in PSM and knows that the UE not able to receive paging. If the MME knows that the UE is in PSM, the MME returns a Downlink Data Notification (DDN) ack with a timer value to an SGW. A timer referred to as "DL buffering duration T" is set based on the knowledge in MME regarding when the UE is expected to perform, for example, a periodic Tracking Area Update (TAU), which corresponds to a maximum duration that the UE will remain in PSM. SGW may need to buffer the DL packets for a duration up to T. When the periodic TAU timer in the UE expires, then the UE will perform TAU, the user plane can be established, and the buffered packets in SGW can be delivered to the UE.

However, the PSM cycle can have a duration of, for example, one to several hours. It is not feasible for the SGW to buffer the DL packet for the whole duration of the PSM cycle. Therefore, the current approach implies that the SGW may need to discard certain buffered packets if the duration T is set too long, and if the UE does not wake up from PSM before the expiration of timer T.

With a first issue, if the timer T is set too long (where the UE is not expected to wake up from PSM soon) it is not feasible to perform buffering in the SGW for the whole duration. The SGW may need to discard the buffered packets, and thus certain MT data is lost.

The same solution (as described above with respect to PSM) can be applied to eDRX. In this case, because the MME is not aware of when the UE is expected to wake up from the eDRX sleep state, the MME reports the timer T as being set to the eDRX cycle value. This means that the SGW generally must be prepared to buffer the MT data packet for a duration of up to the duration of eDRX cycle.

With a second issue, if the eDRX cycle is several minutes, it is not feasible for the SGW to buffer the MT data for the whole duration of the eDRX cycle. Therefore, the SGW may need to discard the buffered packets, and thus the MT data is lost. The eDRX cycle value (as a whole) does not indicate where the UE is within the UE's paging cycle. The UE could be half-way through its paging cycle and, in this case, a MME that provides the whole eDRX value provides a wrong indication regarding the UE's reachability.

Technical Report 23.709 discussed also another solution (Solution 3) in section 5.3, where a middle entity between a core network and a third-party service provider (where the middle entity comprises a service capability server (SCS) or a service capability exposure function (SCEF)) is responsible for buffering the MT data, instead of the SGW being responsible for buffering the MT data. The buffering could be implemented also in a $3^{rd}$ party Application Server (AS). For example, buffering in a service capability exposure function (SCEF) may be performed. The SCEF then subscribes to the UE reachability event from the MME, as defined in Monitoring Enhancements (MONTE) study (TR 23.789).

A direct interface may be established between the SCEF and the MME (i.e., an interface comprising a Tx reference point, for example) or an indirect interface via an HSS. Both options are defined in TR 23.789. When the MME detects that the UE has woken up from PSM (due to reception of TAU or due to a reception of a service request for mobile originated (MO data)), the MME reports the event "UE is reachable" to SCEF. The SCEF may then re-attempt to deliver the MT data packet to the UE. This solution is feasible even for longer buffering periods. On the other hand, if the core network or RAN knows that the UE is expected to wake up soon, it would be more feasible to perform buffering in SGW and thereby avoid implementing triggering of a UE reachability event and buffering in SCEF. However, there has not been any discussion relating to how this solution (Solution 3, buffering in SCEF) and the solution above (Solution 2, buffering in SGW) can be used together.

With a third issue, a concurrent use of the buffering in SGW and the buffering in SCEF, in the same network for the same UE, has not been defined.

With a fourth issue, it may not be feasible to buffer all MT data packets in SGW, as not all packets are delay tolerant. The current solution 2 in TR 23.709 assumes that the SGW or MME can determine the feasibility based on the access point name (APN) or subscription information in the home subscriber server (HSS). But the UE may run multiple applications, and even a single application can include some requests that tolerate the delay while other requests do not tolerate delay. The buffering is feasible only if the data sender (such as a SCEF, for example) knows that the data may be buffered, and if the application protocol tolerates the delay, and if the application does not require delivery of the data carrying the request to be frequently reattempted until delivered.

Certain embodiments of the present invention enable mobile-terminated transactions where the UE is in PSM mode or in eDRX mode. More specifically, certain embodiments of the present invention may: (1) use buffering in the S-GW and SCEF concurrently, and/or (2) provide the ability for north-bound entities to determine UE reachability when a UE is using an eDRX cycle for power savings.

Certain embodiments of the present invention may be applicable in the following example scenarios. In a first scenario, a UE is in PSM, and a network decides to allow the buffering in SGW. In a second scenario, the UE is in PSM, and the network decides to not allow the buffering in SGW. In a third scenario, the UE is in eDRX sleep, and the network decides to allow the buffering in SGW (for example, the S-GW can deliver the MT data before a certain configured time duration for DL buffer in SGW). In a fourth scenario, the UE is in eDRX sleep, and the network decides to not allow extended buffering in SGW. In a fifth scenario, the scenario may correspond to a special scenario when eDRX is used. The fifth scenario may correspond to when the MME knows to page the UE from only one eNB, for example, when the subscription data in HSS indicates the UE is stationary.

Figure 2:
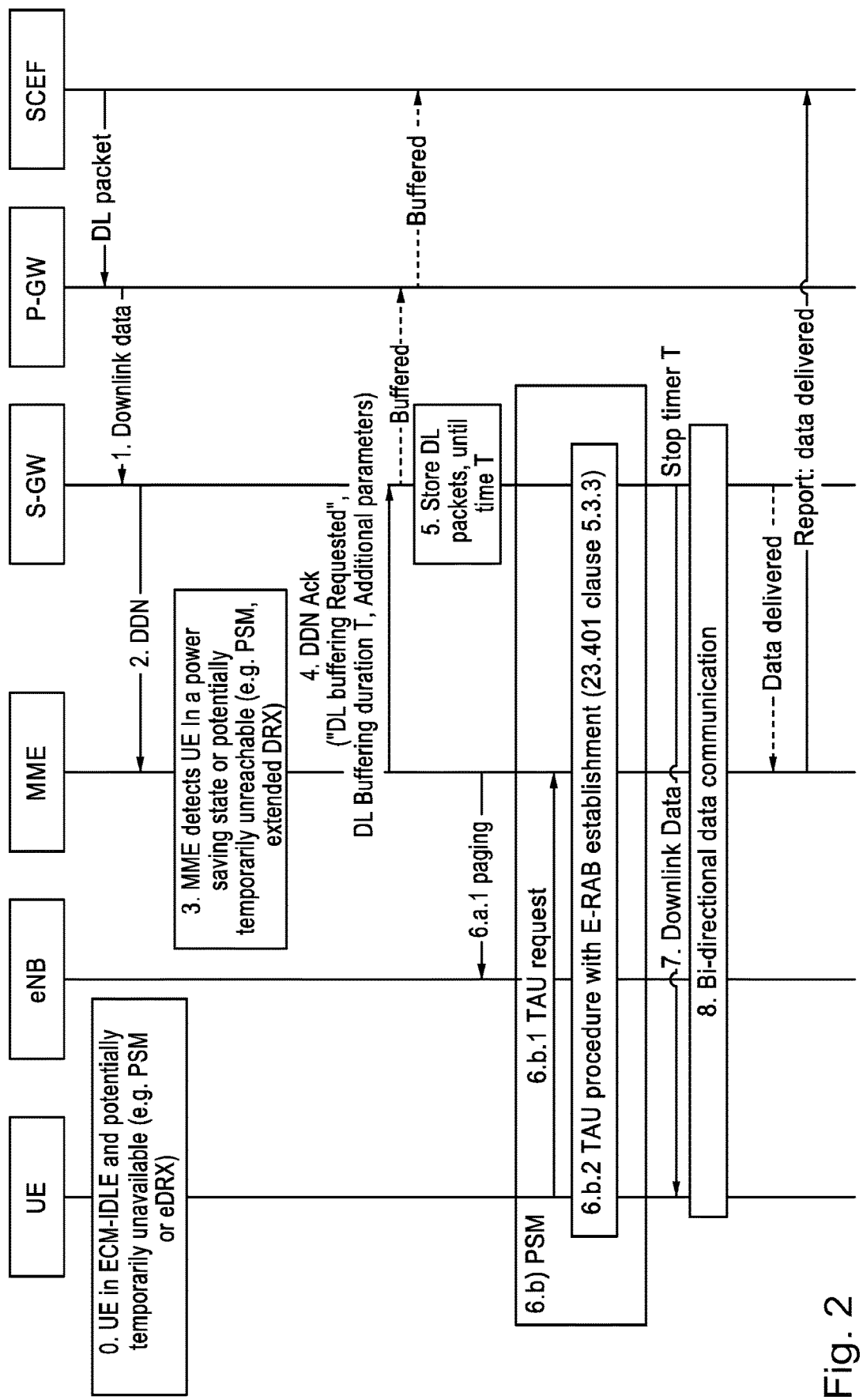
FIG. 2 illustrates a procedure when a Service Creation Environment Function (SCEF) receives an mobile terminated (MT) push trigger.

FIG. 2 illustrates a procedure when an SCEF receives an MT push trigger. With respect to the first scenario, FIG. 2 illustrates a procedure when the SCEF receives an MT push trigger from a $3^{rd}$ party service provider (via an application program interface (API), for example). The SCEF attempts to deliver the MT packet, which carries the push trigger to the UE. The MME determines that the UE is in PSM but is expected to wake up soon.

With a first embodiment, the SGW determines the MT data is delay tolerant and enables a buffering feature only for certain Internet protocol (IP) destination ports. SGW can determine this based on the low priority indicator used to setup the PDN connection. Alternatively, it can use the port numbers. The certain IP destination ports may be ports corresponding to the port numbers that have been defined for Open Mobile Alliance (OMA) Wireless Application Protocol (WAP) Push notifications (UDP ports 2948, 2949). The SGW may also use the source IP address as an additional filter to allow the buffering only from a configured list of SCEFs. If the SGW determines that buffering is allowed, the SGW indicates this determination to the MME in a downlink data notification (DDN) in a new information element. If the indication is not included with the DDN, the MME acts as currently defined in TS 23.401. For example, the MME does not enable the buffering feature.

With a second embodiment, when the MME detects that the UE is in PSM, the MME determines whether the SGW allows the buffering, and whether the UE is expected to wake up soon. For example, the MME may determine that the S-GW allows buffering based on the indication in DDN, and it can determine when the UE is expected to perform the next TAU. The determination may be determined in accordance with a threshold in MME, where the threshold may be configurable. Based on this determination, the MME responds either with a DDN ack (as in current solution 2 in TR 23.709), or with a DDN failure to the SGW. In the former case, the SGW buffers the MT data as in TR 23.709. In the latter case, the SGW discards the MT packet and responds with an indication of failure to the PGW.

In this scenario, the MME decides to allow the buffering in SGW. Therefore, MME responds with a DDN ack and with a timer (as in TR 23.709). The SCEF generally must be informed that the data has been buffered in SGW, so that the SCEF knows to not re-attempt the delivery until the MT data carrying the push trigger has been delivered to the UE.

With a third embodiment, the SGW indicates that the MT data has been buffered by sending an Internet Control Message Protocol (ICMP) Source Quench message to an IP address of the SCEF. The SCEF subscribes for a UE reachability event from the MME (either directly or via a HSS). The MME reports that the UE is not reachable due to PSM. The MME may also report the expected delay for UE reachability (this expected delay may be based on a next TAU from the UE), and the MME may also report an indication that SGW has buffered the data. When the UE performs the next mobile originated (MO) initiated transaction (such as a TAU or MO SR, for example), the MME notifies the SCEF about the UE reachability. Optionally, the SGW can also inform the MME that the data has been delivered to the UE, using a new message. Based on the report from MME, the SCEF knows that the data has been delivered to the UE. These reports from MME to SCEF may be either a part of the "UE reachability" event or may be defined as new event(s).

Current routers may not support the delivery of the ICMP Source Quench message.

Alternatively, with the third embodiment, prior to sending the MT data for the UE, the SCEF subscribes for a UE reachability event from the MME (either directly or via HSS). After the MME has requested buffering the data, and the MME has returned the DDN ack to SGW, the MME reports the "UE is unreachable, MT data is buffered" indication, possibly with the expected delay for the MT data delivery, to the SCEF. When the UE performs the next MO initiated transaction (such as a TAU or MO SR, for example), the MME notifies the SCEF about the UE reachability. Optionally, the SGW can also use a new message to inform the MME that the data has been delivered to the UE. Based on the report from the MME, the SCEF knows that the data has been delivered to the UE. The SCEF can then use this information to report the data delivery to the $3^{rd}$ party server and then empty the MT data from the buffer. These reports from MME to SCEF may be either a part of the "UE reachability" event or may be defined as new event(s).

Alternatively, with the third embodiment, the SCEF can set a timer when sending the MT data. If the timer expires and the SCEF determines that the MT push has not been delivered based on the fact that an MT data delivery event is missing from the MME (the timer may be configurable), then the SCEF assumes the SGW has buffered the data.

Figure 3:
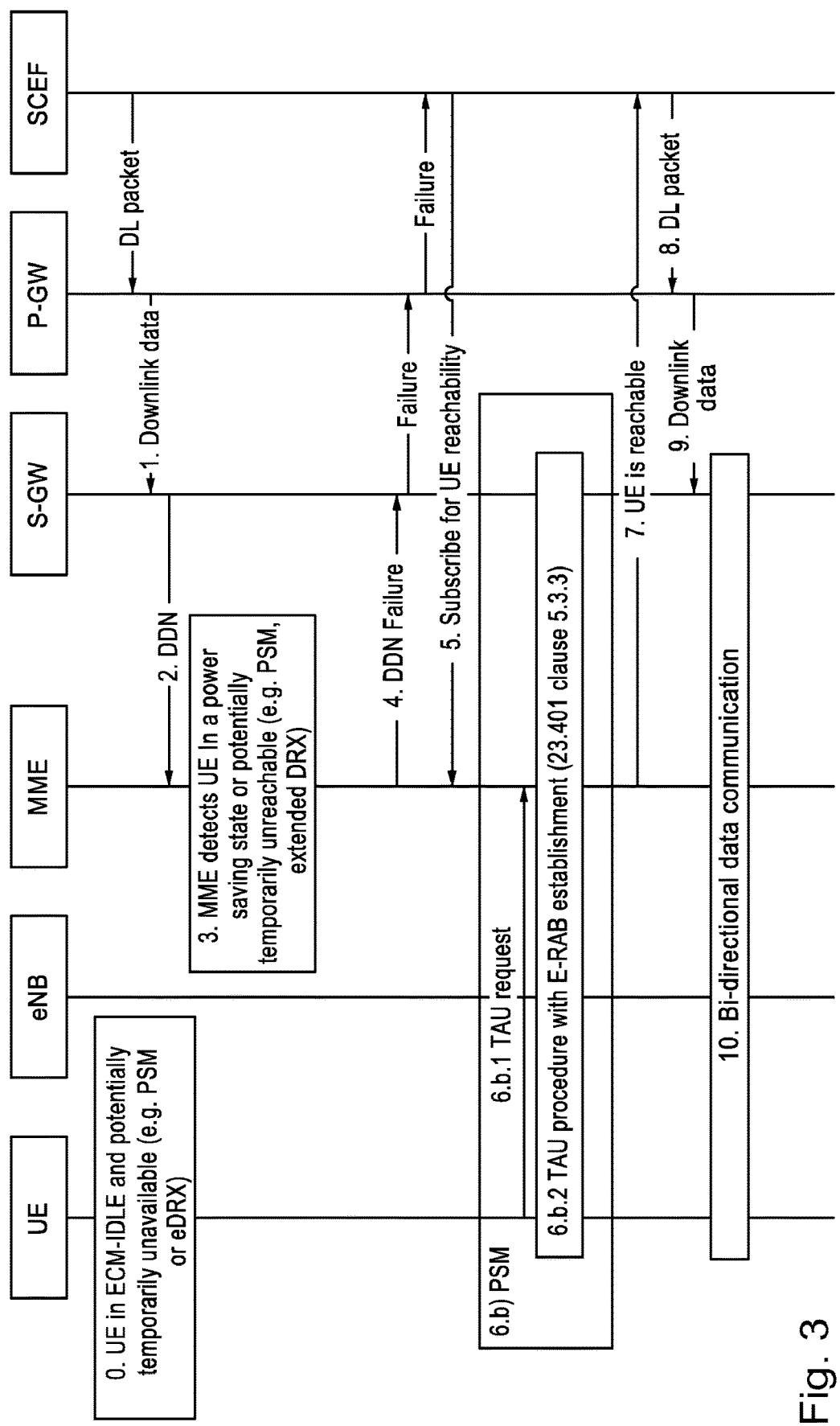
FIG. 3 illustrates a scenario when the mobility management entity (MME) determines that a UE is not expected to wake up from power saving mode (PSM) before the threshold period.

With regard to a second scenario, the FIG. 3 illustrates the scenario when the MME determines that the UE is not expected to wake up from PSM before the threshold period.

In this scenario, the MME determines that the UE is in PSM and that the UE is not expected to wake up soon. Therefore, the MME responds with an indication of DDN failure to SGW. SGW reports the failure to PGW, which reports the failure to SCEF. For example, the ICMP Destination Unreachable message can be used to indicate the failure from SGW to SCEF.

With a fourth embodiment, based on the failure indication, the SCEF knows that the SGW did not buffer the data, and that the SCEF must buffer the data. The SCEF generally must subscribe for UE reachability event from the MME. Depending on the configuration, the ICMP may not pass the firewalls between the SGW and the SCEF. Therefore, the SCEF can use a similar procedure, as discussed in Scenario 1, to subscribe to the data delivery events from the MME. In this scenario, the MME reports the event "UE is unreachable" or more specifically, MME can report that "UE is in PSM, MT data has not been buffered," possibly with the expected delay for UE reachability.

When the UE wakes up from the PSM, the MME reports the UE reachability event to the SCEF, either directly or via HSS. The SCEF can then re-attempt to deliver the data to the UE. As the UE is in an EPS Connection Management— connected (ECM-connected) state, and as the MME may have initiated the radio bearer for the user plane, there is no need to page the UE, and the SGW can deliver the MT packet that carries the trigger to the UE.

Figure 4:
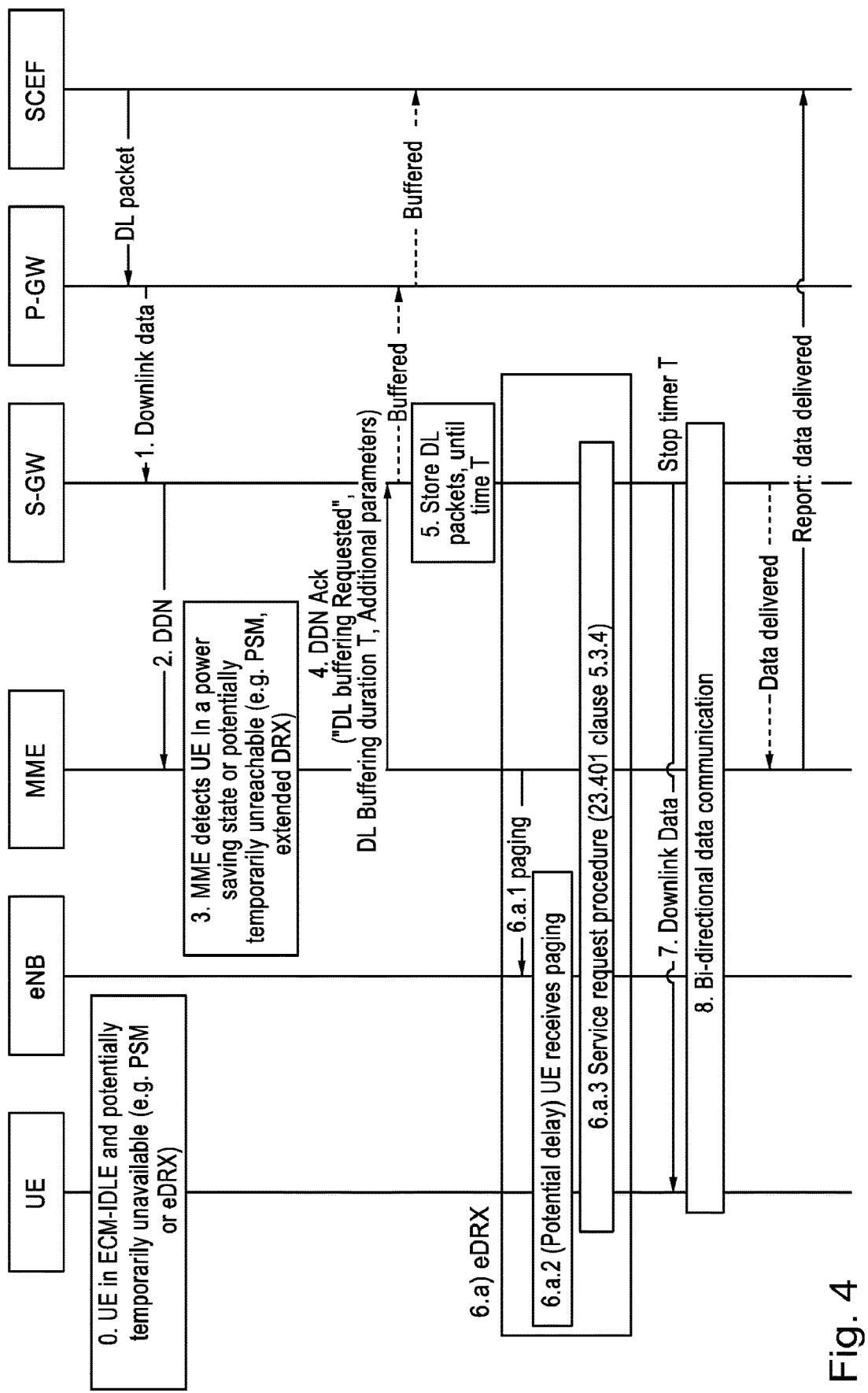
FIG. 4 illustrates the scenario when the MME detects that the UE is using enhanced discontinuous reception (eDRX), and the MT data can be delivered to the UE before time-out in serving gateway (SGW).

With a third scenario, FIG. 4 illustrates the scenario when the MME detects that the UE is using eDRX, and that the MT data can be delivered to the UE before time-out in SGW.

The assumption here is that the eDRX cycle is negotiated in Non-Access Stratum (NAS) protocol between the UE and the MME in Attach and TAU procedures. This has been discussed in TR 23.887, but has not yet been specified in normative specifications. Therefore, MME is aware that the UE uses eDRX cycles for paging.

The MME responds to SGW with DDN ack and with the "DL buffering duration T" as in Solution 2 in TR 23.709. The SGW buffers the MT data as in TR 23.709.

With a fifth embodiment, in a similar manner as in Scenario 1, the MME reports that the "UE is unreachable" or more specifically, MME can report that "UE uses eDRX, MT data has been buffered" to the SCEF. The report can also contain the maximum delay to deliver the MT data. The maximum delay may be set to the eDRX cycle duration. When the UE receives the paging, then the UE performs the Service Request, and then the MME notifies the SCEF about the UE reachability. Optionally, the SGW can also inform the MME that the data has been delivered to the UE, using a new message. Based on the report from the MME, the SCEF knows the data has been delivered to the UE. SCEF can then use this information to report the data delivery to the $3^{rd}$ party server and empty the MT data from the buffer.

With a fourth scenario, FIG. 5 illustrates the scenario when the MME detects that the UE is using eDRX and that the MT data cannot be delivered to the UE before time-out occurs in SGW.

With a sixth embodiment, in a similar manner as described with respect to Scenario 3, the MME reports the "UE is unreachable" or more specifically, MME can report that "UE uses eDRX, MT data has been buffered" to the SCEF. The report can also contain a maximum delay for delivering the MT data, in the delay is set to the eDRX cycle. In this scenario, the timer expires in the SGW before the UE responds to the paging, and before MT data can be delivered. There can also be other reasons for the SGW to discard the MT data such as, for example, if the buffer is overflown. The SGW reports to the MME that the data has been discarded in a new message. The MME reports the event "Data is discarded" to the SCEF. Based on the report from the MME, the SCEF knows that the data was not delivered to the UE. In this case, SCEF should store the DL and subscribe for the UE reachability event either with the MME directly or via the HSS. When the SCEF is notified of UE reachability again, the SCEF will attempt to deliver the DL data. The SCEF can also re-attempt to deliver the MT data earlier.

Figure 6:
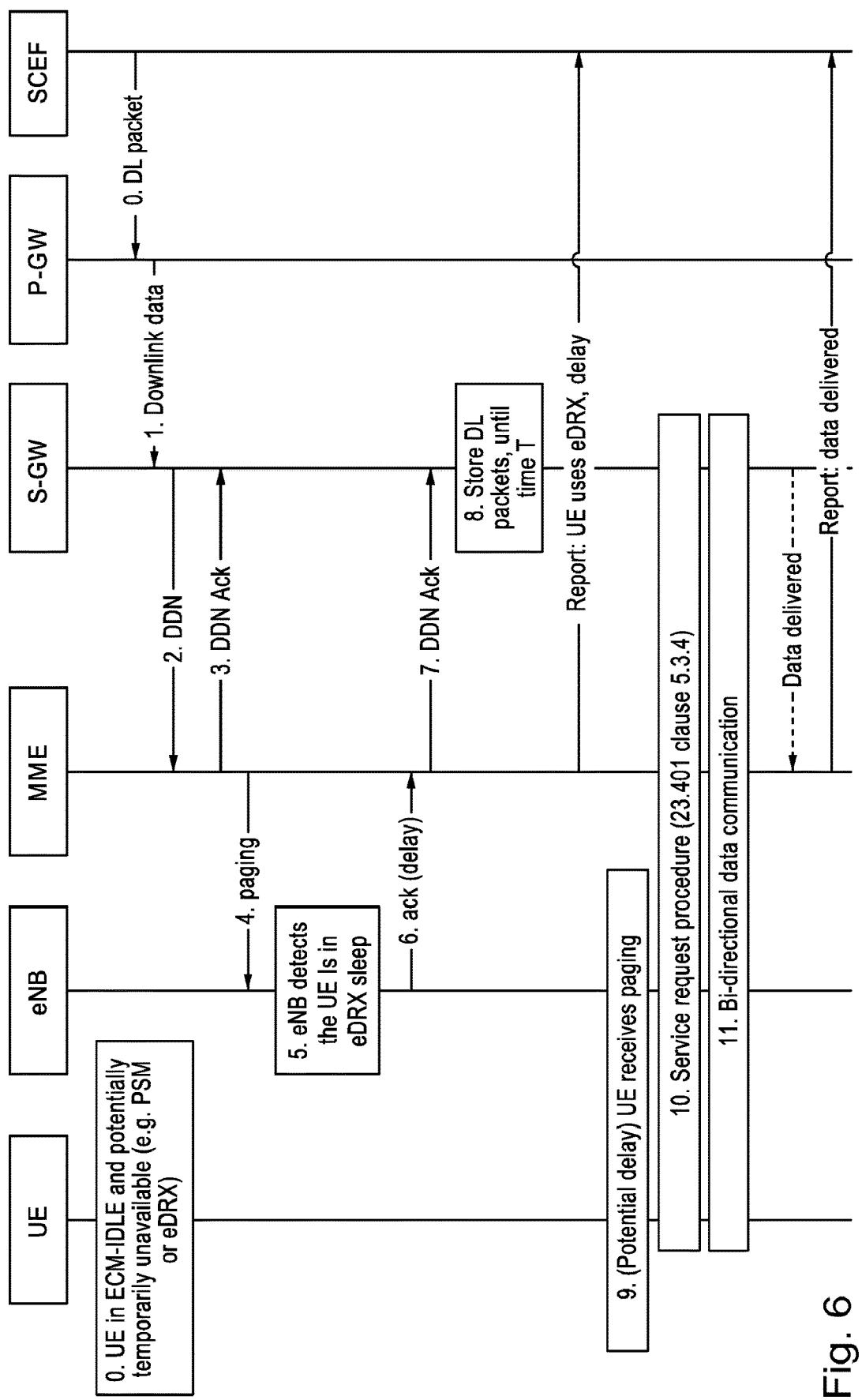
FIG. 6 illustrates the scenario when the UE uses eDRX.

With a fifth scenario, the UE uses eDRX, and the MME pages only one eNB. FIG. 6 illustrates the scenario when the UE uses eDRX. The UE uses eDRX and the MME pages only one eNB because the step-wise paging procedure is used where only the "last-known" eNB is always paged at first, prior to attempting to page the other eNBs, or because the MME knows that the UE is stationary. For example, the MME may know that the UE does not move, for example, based on the user subscription data in Home Subscriber Server (HSS).

The MME sends the paging to the selected eNB. With a sixth embodiment, the eNB determines the delay that the Paging Occasion will incur for this UE. Based on this delay, the eNB determines whether the eNB allows the paging procedure to continue. In this scenario, the eNB allows the paging procedure to continue. The paging procedure in S1AP (TS 36.413) is enhanced to include a response from the eNB to the MME. The eNB uses the response to indicate that the delivery of paging will take longer due to use of eDRX. The response also carries the delay to the Paging Occasion. The MME sends a second DDN ack (or another suitable, new response for DDN) to the SGW, where the response carries the expected delay. The SGW buffers the MT data as described in Solution 2 in TR 23.709.

Figure 7:
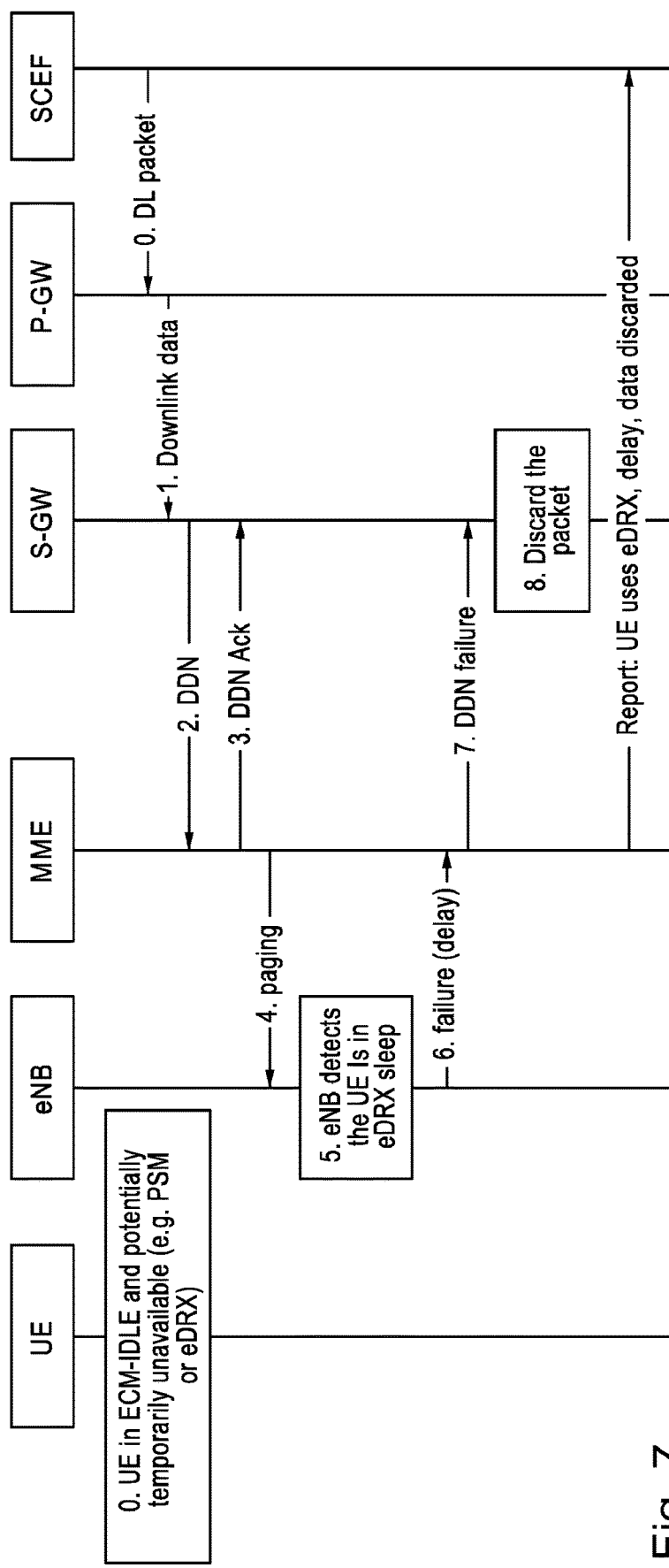
FIG. 7 illustrates the scenario when the MME provides a report to the service capability exposure function (SCEF).

FIG. 7 illustrates the scenario when the MME provides a report to the SCEF. With a seventh embodiment, in a similar manner as in Scenario 3, the MME reports that the "UE is unreachable" or more specifically, MME can report that "UE uses eDRX, MT data has been buffered" to the SCEF. However, in this scenario also, the expected delay is reported from the MME to the SCEF. The report can also contain the maximum delay to deliver the MT data. In this case, the maximum delay is set to the delay to the Paging Occasion. When the UE receives the paging, the UE performs the Service Request, and the MME notifies the SCEF about the UE reachability. Optionally, the SGW can also inform the MME that the data has been delivered to the UE, using a new message. Based on the report from MME, the SCEF knows that the data has been delivered to the UE. The SCEF can use this information to report the data delivery to the 3$^{rd}$ party server and to empty the MT data from the buffer. If the eNB determines that the delay to Paging Occasion is too long, the eNB responds with a Paging failure (a new response to paging procedure), with the delay to the Paging Occasion (PO).

The MME reports the DDN failure to SGW. The SGW discards the packet. The MME reports the event "UE is unreachable" or more specifically, MME can report that"UE uses eDRX, Data is discarded" to the SCEF, with the delay to the PO. Based on the reported delay, the SCEF knows when to re-attempt the delivery of MT data.

With an eighth embodiment, as an alternative to the new responses to paging procedure in S1AP, a new query procedure could be defined for S1AP in TS 36.413. The MME uses this procedure prior to sending the paging to the eNB. The eNB responds with the delay to the Paging Occasion for this UE. The MME can then determine whether to allow the buffering in the S-GW, as discussed with Scenarios 1 and 2.

Figure 8:
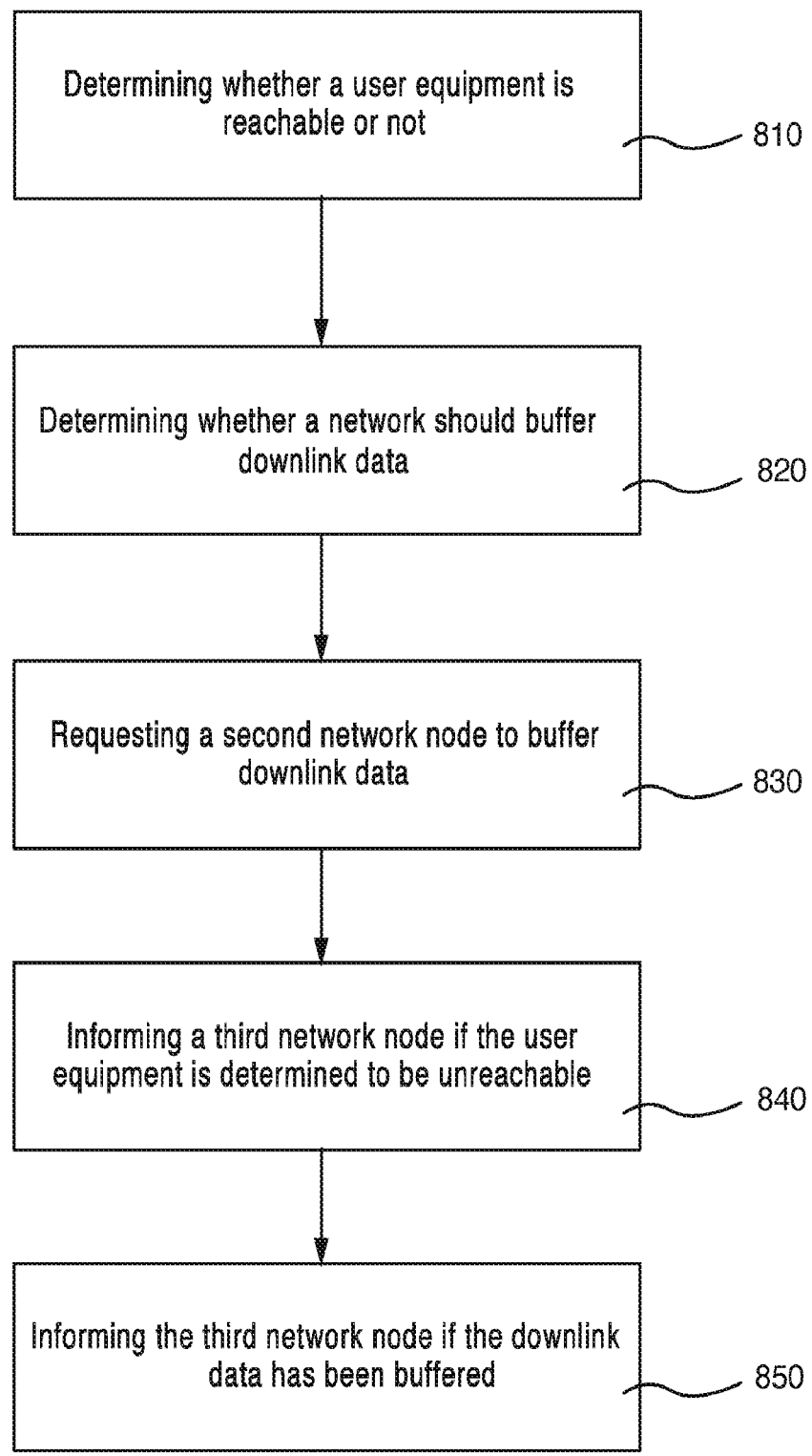
FIG. 8 illustrates a flowchart of a method in accordance with certain embodiments of the invention.

FIG. 8 illustrates a flowchart of a method in accordance with certain embodiments of the invention. The method illustrated in FIG. 8 includes, at 810, determining, by a first network node, whether a user equipment is reachable or not. The method also includes, at 820, determining whether a network should buffer downlink data. The determining whether the network should buffer the downlink data is based on stored context information or by querying an evolved Node B. The method also includes, at 830, requesting a second network node to buffer the downlink data for a duration. The method also includes, at 840, informing a third network node if the user equipment is determined to be unreachable. The method also includes, at 850, informing the third node if the downlink data has been buffered.

Figure 9:
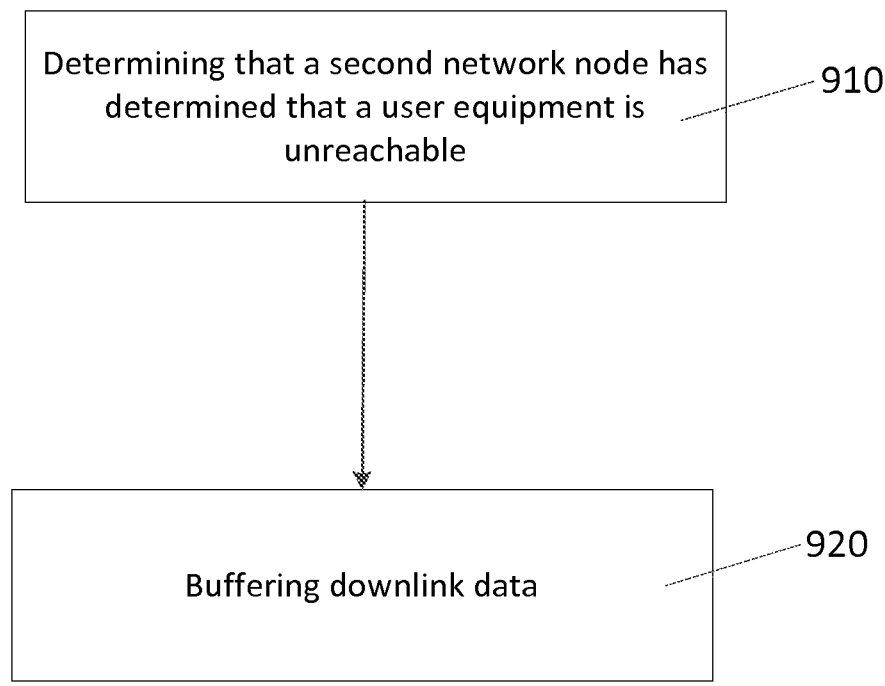
FIG. 9 illustrates a flowchart of another method in accordance with certain embodiments of the invention.

FIG. 9 illustrates a flowchart of a method in accordance with certain embodiments of the invention. The method illustrated in FIG. 9 includes, at 910, determining, by a first network node, that a second network node has determined that a user equipment is unreachable as a result of the user equipment being in a power-saving mode or an extended discontinuous sleep mode. The method also includes, at 920, buffering downlink data for a certain duration.

Figure 10:
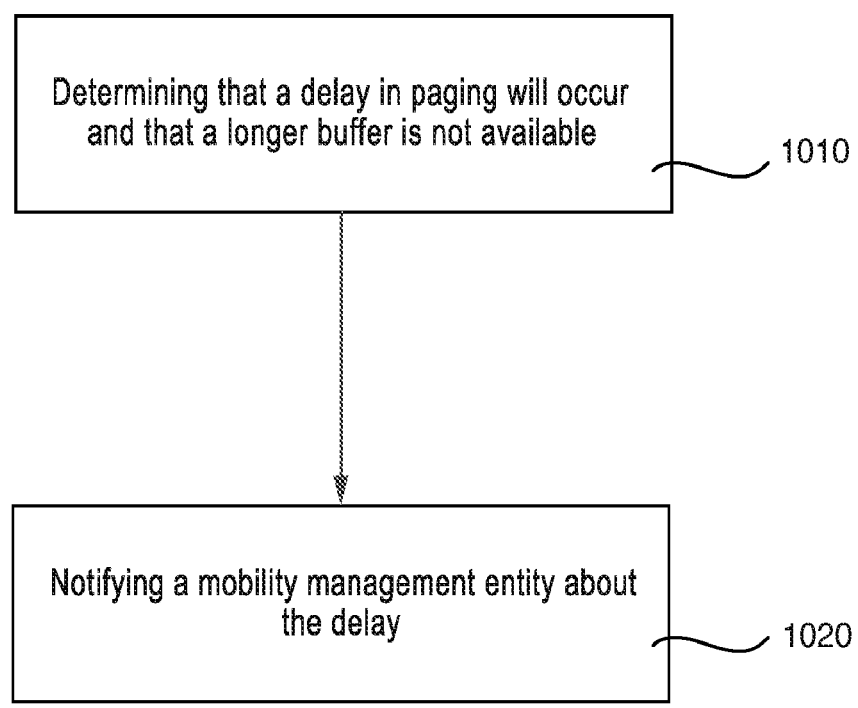
FIG. 10 illustrates a flowchart of another method in accordance with certain embodiments of the invention.

FIG. 10 illustrates a flowchart of a method in accordance with certain embodiments of the invention. The method illustrated in FIG. 10 includes, at 1010, determining, by an evolved Node B, that a delay in paging will occur and that a longer buffer is not available. The method also includes, at 1020, notifying a mobility management entity about the delay.

Figure 11:
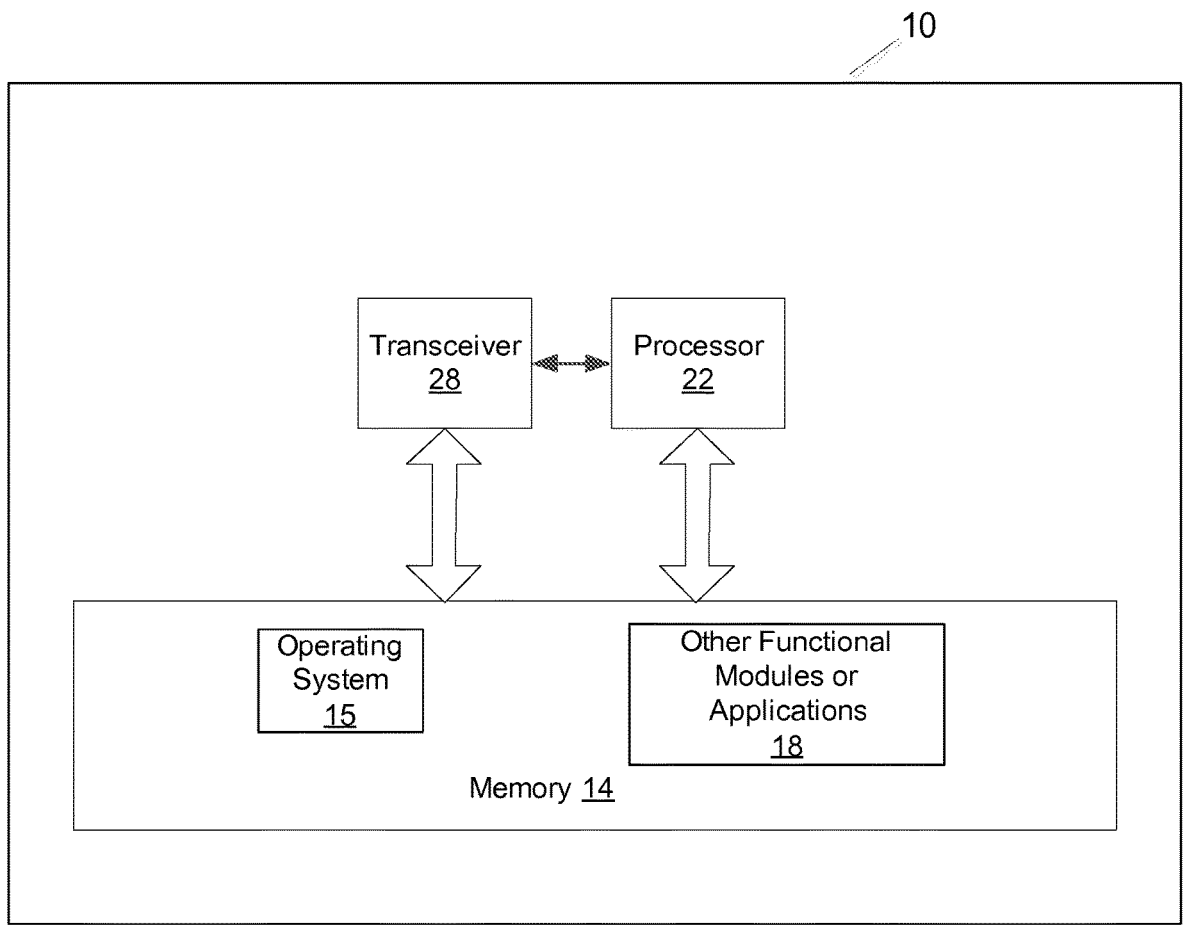
FIG. 11 illustrates an apparatus in accordance with certain embodiments of the invention.

FIG. 11 illustrates an apparatus in accordance with certain embodiments of the invention. In one embodiment, the apparatus can be a user equipment, a base station, a SGW, an MME, an eNB, and/or a SCEF, for example. The apparatus can be a network node. Apparatus 10 can include a processor 22 for processing information and executing instructions or operations. Processor 22 can be any type of general or specific purpose processor. While a single processor 22 is shown in FIG. 11, multiple processors can be utilized according to other embodiments. Processor 22 can also include one or more of general-purpose computers, special purpose computers, microprocessors, digital signal processors (DSPs), field-programmable gate arrays (FP-GAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources. Apparatus 10 may perform the method of FIGS. 8-10, as described above.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 12:
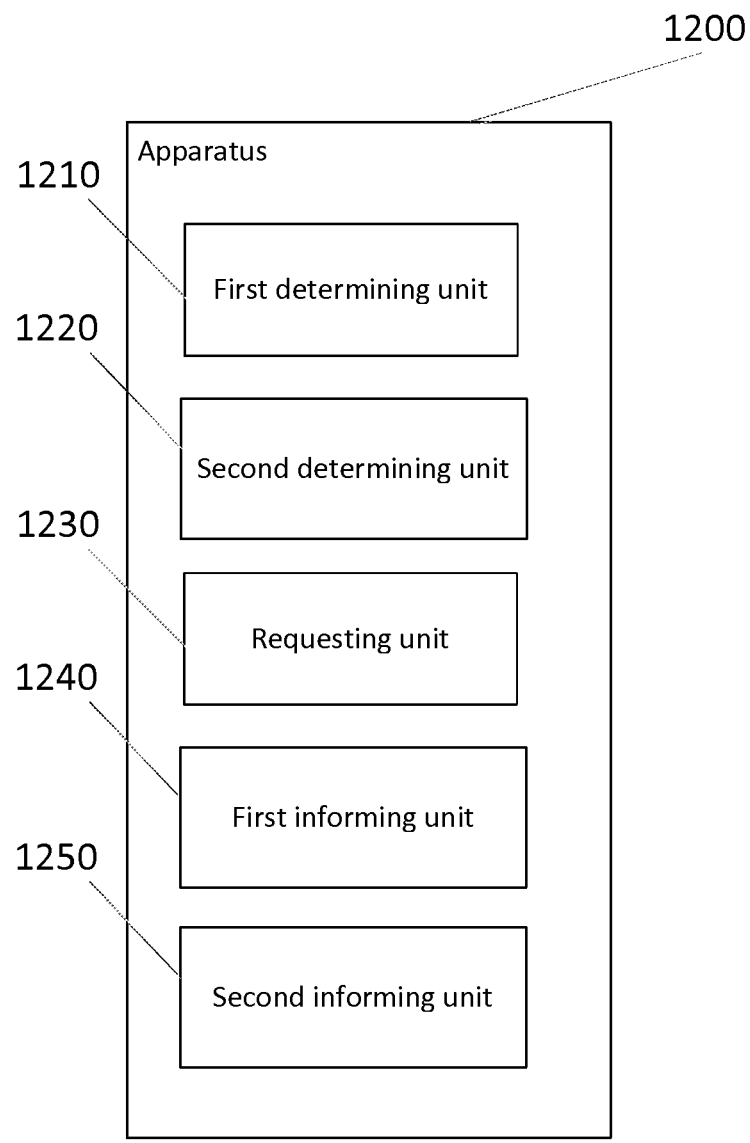
FIG. 12 illustrates an apparatus in accordance with certain embodiments of the invention.

FIG. 12 illustrates an apparatus in accordance with certain embodiments of the invention. Apparatus 1200 can be a network element/entity such as a mobility management entity, for example. Apparatus 1200 can include a first determining unit 1210 that determines whether a user equipment is reachable or not. Apparatus 1200 may also include a second determining unit 1220 that determines whether a network should buffer downlink data. The determining whether the network should buffer the downlink data is based on stored context information or by querying an evolved Node B. Apparatus 1200 may also include a requesting unit 1230 that requests a network node to buffer the downlink data for a duration. Apparatus 1200 may also include an informing unit 1240 that informs a third network node if the user equipment is determined to be unreachable. Apparatus 1200 may also include an informing unit 1250 that informs the third node if the downlink data has been buffered.

Figure 13:
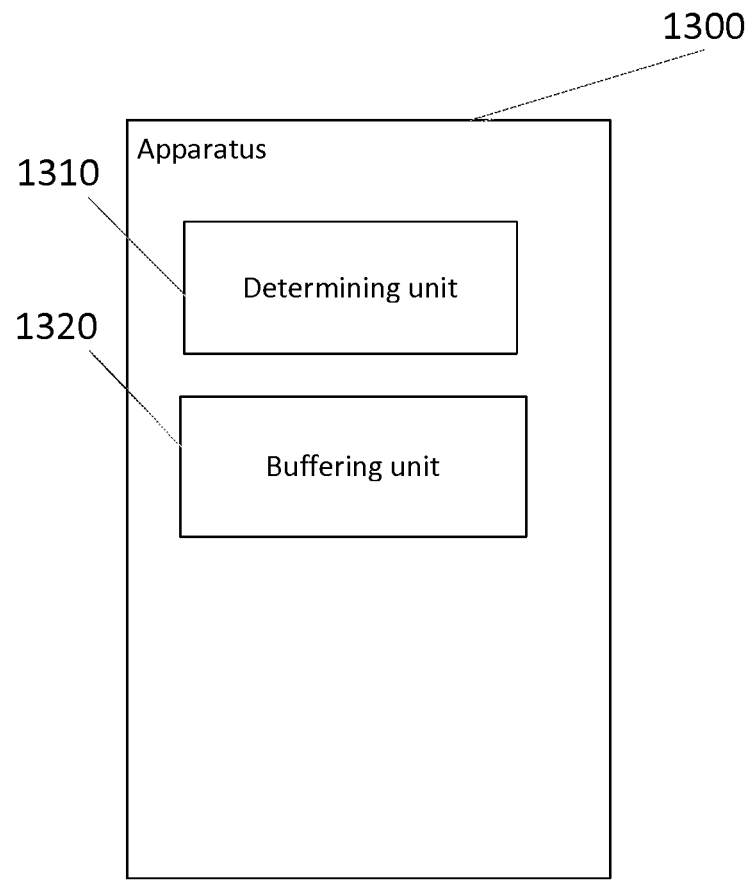
FIG. 13 illustrates an apparatus in accordance with certain embodiments of the invention.

FIG. 13 illustrates an apparatus in accordance with certain embodiments of the invention. Apparatus 1300 can be a network element/entity such as a SGW, for example. Apparatus 1300 can include a determining unit 1310 that determines that a second network node has determined that a user equipment is unreachable as a result of the user equipment being in a power-saving mode or an extended discontinuous sleep mode. Apparatus 1300 may also include a buffering unit 1320 that buffers downlink data for a certain duration.

Figure 14:
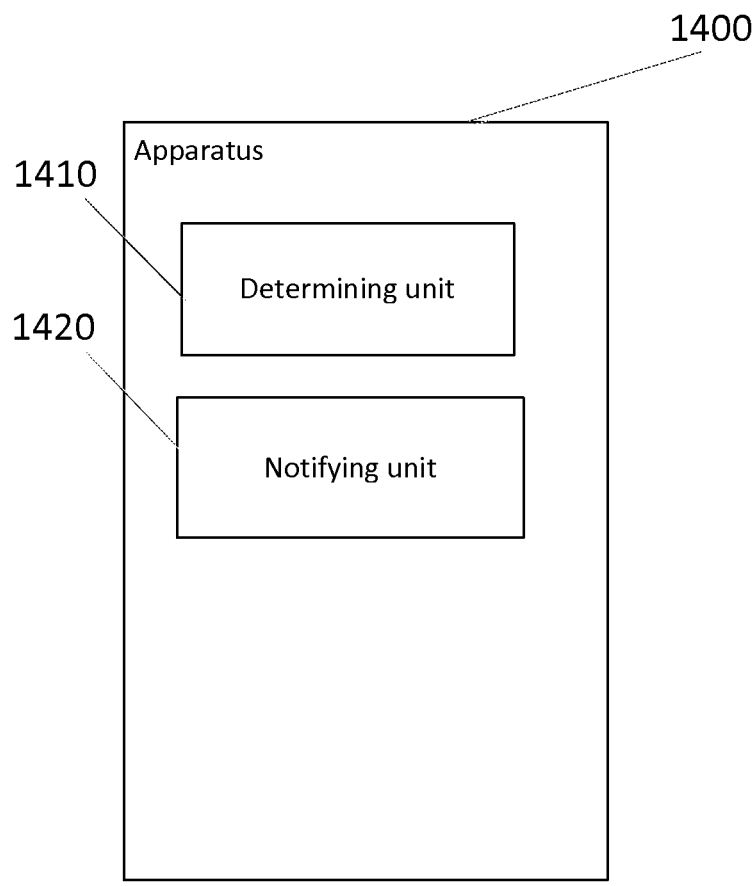
FIG. 14 illustrates an apparatus in accordance with certain embodiments of the invention.

FIG. 14 illustrates an apparatus in accordance with certain embodiments of the invention. Apparatus 1400 can be an evolved Node B, for example. Apparatus 1400 can include determining means 1410 that determines that a delay in paging will occur and that a longer buffer is not available. Apparatus 1400 may also include notifying means 1420 that notifies a mobility management entity about the delay.

Figure 15:
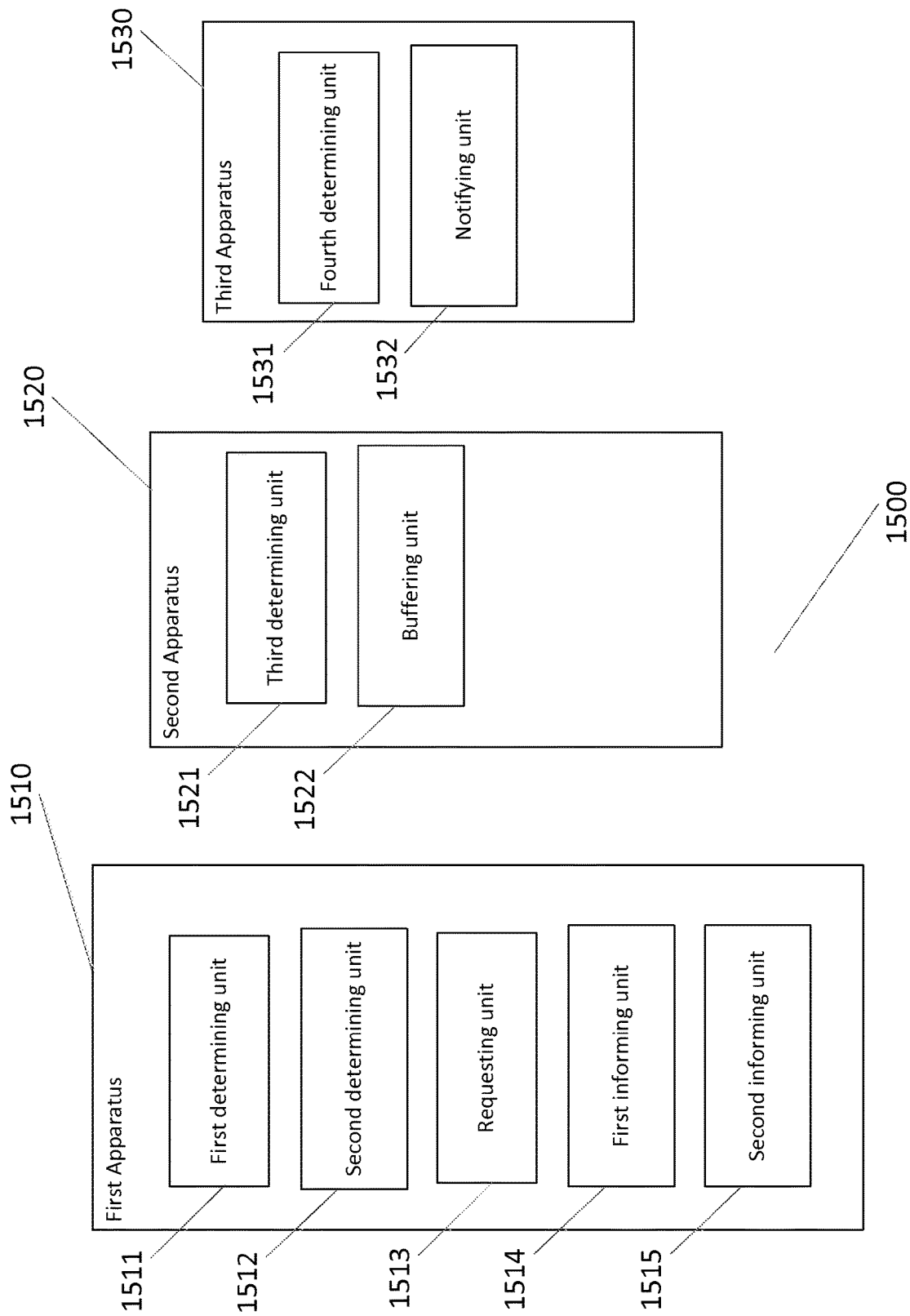
FIG. 15 illustrates a system in accordance with certain embodiments of the invention.

FIG. 15 illustrates a system 1500 in accordance with certain embodiments of the invention. A system 1500 may include a first apparatus 1510, a second apparatus 1520, and a third apparatus 1530. The first apparatus 1510 may include first determining means 1511 that determines whether a user equipment is reachable or not. The first apparatus 1510 may also include second determining means 1512 that determines whether a network should buffer downlink data. The determining whether the network should buffer the downlink data is based on stored context information or by querying an evolved Node B. The first apparatus 1510 may also include a requesting means 1513 that requests a second apparatus 1520 to buffer the downlink data for a duration. The first apparatus 1510 may also include first informing means 1514 that informs a third apparatus 1530 if the user equipment is determined to be unreachable. The first apparatus 1510 may also include second informing means 1515 that informs the third apparatus if the downlink data has been buffered. The second apparatus 1520 may include third determining means 1521 that determines that the first apparatus 1510 has determined that a user equipment is unreachable as a result of the user equipment being in a power-saving mode or an extended discontinuous sleep mode. The second apparatus 1520 may also include buffering means 1522 that buffers downlink data for a certain duration. The third apparatus 1530 may include fourth determining means 1531 that determines that a delay in paging will occur and that a longer buffer is not available. The third apparatus 1530 may also include notifying means 1532 that notifies a mobility management entity about the delay.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining, by a first network node, whether a user equipment is reachable or not;
   determining whether a network should buffer downlink data, wherein the determining whether the network should buffer the downlink data is based on stored context information or by querying an evolved Node B;
   requesting a second network node to buffer the downlink data for a duration;
   informing a third network node if the user equipment is determined to be unreachable; and
   informing the third network node if the downlink data has been buffered.

2. The method according to claim 1, wherein the user equipment is determined to not be reachable if the user equipment is in a power-saving mode or an extended discontinuous sleep mode.

3. The method according to claim 1, wherein the first network node comprises a mobility management entity, the second network node comprises a serving gateway, and the third network node comprises an application server or a service capability exposure function.

4. The method according to claim 1, further comprising:
   determining that the user equipment is stationary; and
   paging a last-known evolved Node B to which the user equipment was connected to, wherein the user equipment is determined to be in an extended discontinuous sleep mode.

5. The method according to claim 1, further comprising:
   determining that the user equipment will wake up soon from power saving mode based upon a configurable threshold; and
   transmitting either a downlink data notification acknowledgment or a downlink data notification failure to the second network node.

6. An apparatus, comprising:
   at least one processor; and
   at least one memory including computer program code, the at least one memory and the computer program code configured, with the at least one processor, to cause the apparatus at least to determine whether a user equipment is reachable or not;

determine whether a network should buffer downlink data, wherein the determining whether the network should buffer the downlink data is based on stored context information or by querying an evolved Node B;

request a first network node to buffer the downlink data for a duration;

inform a second network node if the user equipment is determined to be unreachable; and inform the second network node if the downlink data has been buffered.

7. The apparatus according to claim 6, wherein the user equipment is determined to not be reachable if the user equipment is in a power-saving mode or an extended discontinuous sleep mode.

8. The apparatus according to claim 6, wherein the apparatus comprises a mobility management entity, the first network node comprises a serving gateway, and the second network node comprises an application server or a service capability exposure function.

9. The apparatus according to claim 6, wherein the apparatus is further caused to:

determine that the user equipment is stationary; and page a last-known evolved Node B to which the user equipment was connected to, wherein the user equipment is determined to be in an extended discontinuous sleep mode.

10. The apparatus according to claim 6, wherein the apparatus is further caused to:

determine that the user equipment will wake up soon from power saving mode based upon a configurable threshold; and transmit either a downlink data notification acknowledgment or a downlink data notification failure to the first network node.

11. A method, comprising:

determining, by a first network node, that a second network node has determined that a user equipment is unreachable as a result of the user equipment being in a power-saving mode or an extended discontinuous sleep mode;

determining that buffering downlink data is allowed, wherein the determining is based on stored context information; and buffering the downlink data for a certain duration.

12. The method according to claim 11, wherein the first network node comprises a serving gateway, and the second network node comprises a mobility management entity.

13. The method according to claim 11, further comprising receiving a downlink data notification acknowledgment or a downlink data notification failure from the second network node.

14. An apparatus, comprising:

at least one processor; and at least one memory including computer program code, the at least one memory and the computer program code configured, with the at least one processor, to cause the apparatus at least to determine that a network node has determined that a user equipment is unreachable as a result of the user equipment being in a power-saving mode or an extended discontinuous sleep mode;

determine that buffering downlink data is allowed, wherein the determining is based on stored context information; and buffer the downlink data for a certain duration.

15. The apparatus according to claim 14, wherein the apparatus is further caused to receive a downlink data notification acknowledgment or a downlink data notification failure from the network node.

* * * * *